US009465187B2

(12) United States Patent
Calvet

(10) Patent No.: US 9,465,187 B2
(45) Date of Patent: Oct. 11, 2016

(54) THERMAL DESPACE COMPENSATION SYSTEMS AND METHODS

(71) Applicant: DigitalOptics Corporation MEMS, Arcadia, CA (US)

(72) Inventor: Robert J. Calvet, Arcadia, CA (US)

(73) Assignee: DIGITALOPTICS CORPORATION MEMS, Arcadia, CA (US)

(*) Notice: Subject to any disclaimer, the term of this patent is extended or adjusted under 35 U.S.C. 154(b) by 628 days.

(21) Appl. No.: 13/838,210

(22) Filed: Mar. 15, 2013

(65) Prior Publication Data

US 2013/0271641 A1 Oct. 17, 2013

Related U.S. Application Data

(63) Continuation-in-part of application No. 12/946,515, filed on Nov. 15, 2010, now Pat. No. 8,619,378, and a continuation-in-part of application No. 13/247,898, filed on Sep. 28, 2011, now Pat. No. 8,768,157.

(51) Int. Cl.
*G02B 7/02* (2006.01)
*H04N 5/225* (2006.01)
*G03B 3/10* (2006.01)

(52) U.S. Cl.
CPC .............. *G02B 7/028* (2013.01); *G02B 7/022* (2013.01); *G03B 3/10* (2013.01); *H04N 5/2254* (2013.01); *G03B 2205/0061* (2013.01); *Y10T 29/49002* (2015.01)

(58) Field of Classification Search
CPC .............. G02B 7/028; G02B 7/022; G03B 2205/0061; G03B 3/10; H04N 5/2254; Y10T 29/49002
See application file for complete search history.

(56) References Cited

U.S. PATENT DOCUMENTS

| | | | |
|---|---|---|---|
| 4,662,717 A | 5/1987 | Yamada et al. |
| 4,957,341 A | 9/1990 | Hasegawa |
| 5,024,509 A | 6/1991 | Kurihara |
| 5,572,369 A | 11/1996 | Estelle et al. |
| 5,572,785 A | 11/1996 | Tveit |
| 5,589,989 A | 12/1996 | Estelle et al. |
| 5,612,826 A | 3/1997 | Ohshita |
| 6,072,634 A | 6/2000 | Broome et al. |
| 6,384,510 B1 | 5/2002 | Grade et al. |
| 6,574,053 B1 | 6/2003 | Spinali |
| 7,068,448 B2 | 6/2006 | Huang |
| 7,088,530 B1 | 8/2006 | Recco et al. |

(Continued)

FOREIGN PATENT DOCUMENTS

| | | |
|---|---|---|
| CN | 1661902 A | 8/2005 |
| CN | 101047226 A | 10/2007 |

(Continued)

*Primary Examiner* — Alicia M Harrington
(74) *Attorney, Agent, or Firm* — Haynes and Boone, LLP

(57) ABSTRACT

Techniques are disclosed for systems and methods to provide thermal despace compensation for optics assemblies, such as devices including one or more lenses and/or optical devices. A thermal despace compensation system may include one or more interfaces substantially situated between optical devices that expand and contract with changing temperature according to their coefficients of thermal expansion (CTEs). Each interface may be implemented with one or more shapes and/or interfaces adapted to provide a compensation despace to compensate for thermal expansion and contraction and/or reduce optical defects caused by changes in temperature of the various optical devices.

27 Claims, 10 Drawing Sheets

(56) References Cited

U.S. PATENT DOCUMENTS

| | | |
|---|---|---|
| 7,609,466 B2 | 10/2009 | Yen |
| 7,613,389 B2 | 11/2009 | Suzuki et al. |
| 7,715,129 B2 | 5/2010 | Neely et al. |
| 7,729,606 B2 | 6/2010 | Webster et al. |
| 7,738,196 B2 | 6/2010 | Seki |
| 7,755,856 B2 | 7/2010 | Chang |
| 7,755,858 B2 | 7/2010 | Chen |
| 7,773,319 B2 | 8/2010 | Yu |
| 7,830,623 B2 | 11/2010 | Hara |
| 7,850,377 B2 | 12/2010 | Okamoto et al. |
| 7,969,668 B2 | 6/2011 | Chou |
| 7,971,344 B2 | 7/2011 | Wu |
| 8,014,655 B2 | 9/2011 | Chang et al. |
| 2002/0067103 A1 | 6/2002 | Jerman |
| 2003/0174294 A1 | 9/2003 | Yanagisawa |
| 2003/0184885 A1 | 10/2003 | Tansho et al. |
| 2003/0193605 A1 | 10/2003 | Yamaguchi |
| 2004/0042088 A1 | 3/2004 | Ito |
| 2005/0122484 A1 | 6/2005 | Rodriguez, Jr. et al. |
| 2005/0122599 A1 | 6/2005 | Lu |
| 2005/0157402 A1 | 7/2005 | Rodriguez, Jr. et al. |
| 2005/0237629 A1 | 10/2005 | Lu et al. |
| 2006/0139771 A1 | 6/2006 | Kajiwara |
| 2006/0140623 A1 | 6/2006 | Yu |
| 2006/0285090 A1 | 12/2006 | Rodriguez, Jr. |
| 2007/0058045 A1 | 3/2007 | Misawa |
| 2007/0064207 A1 | 3/2007 | Rodriguez, Jr. et al. |
| 2007/0173794 A1 | 7/2007 | Frey et al. |
| 2007/0173795 A1 | 7/2007 | Frey et al. |
| 2007/0185475 A1 | 8/2007 | Frey et al. |
| 2007/0216888 A1 | 9/2007 | Kugler et al. |
| 2007/0285624 A1 | 12/2007 | Rodriguez, Jr. et al. |
| 2008/0137040 A1 | 6/2008 | Rodriguez et al. |
| 2008/0297726 A1 | 12/2008 | Rodriguez, Jr. et al. |
| 2009/0052063 A1 | 2/2009 | Yu |
| 2009/0086342 A1 | 4/2009 | Seki |
| 2009/0174954 A1 | 7/2009 | Hara |
| 2009/0190241 A1 | 7/2009 | Yen |
| 2009/0244735 A1 | 10/2009 | Sasaki |
| 2009/0244736 A1 | 10/2009 | Sasaki |
| 2009/0290239 A1 | 11/2009 | Wu |
| 2010/0004641 A1 | 1/2010 | Frey et al. |
| 2010/0004643 A1 | 1/2010 | Frey et al. |
| 2010/0079733 A1 | 4/2010 | Lu |
| 2010/0228119 A1 | 9/2010 | Brennan et al. |
| 2010/0228123 A1 | 9/2010 | Brennan et al. |
| 2010/0228124 A1 | 9/2010 | Brennan et al. |
| 2010/0228132 A1 | 9/2010 | Brennan et al. |
| 2010/0228238 A1 | 9/2010 | Brennan et al. |
| 2011/0026144 A1 | 2/2011 | Shyu et al. |
| 2011/0058265 A1 | 3/2011 | Chang et al. |
| 2011/0063739 A1 | 3/2011 | Hirata et al. |
| 2011/0069198 A1 | 3/2011 | Ezawa et al. |
| 2011/0075269 A1 | 3/2011 | Rodriguez, Jr. et al. |
| 2011/0075279 A1* | 3/2011 | Reichmann et al. ......... 359/820 |
| 2012/0032286 A1 | 2/2012 | Trusov et al. |
| 2012/0081598 A1 | 4/2012 | Calvet et al. |

FOREIGN PATENT DOCUMENTS

| | | |
|---|---|---|
| CN | 101196613 A | 6/2008 |
| EP | 0978832 A2 | 2/2000 |
| WO | WO 99/37013 | 7/1999 |
| WO | WO 01/96930 A1 | 12/2001 |
| WO | WO 2012/074748 | 6/2012 |

\* cited by examiner

THERMAL DESPACE COMPENSATION SYSTEMS AND METHODS

CROSS-REFERENCE TO RELATED APPLICATIONS

This continuation-in-part patent application claims the benefit of and priority to U.S. patent application Ser. No. 12/946,515 filed Nov. 15, 2010 and entitled "ROTATIONAL COMB DRIVE Z-STAGE" which was issued as U.S. Pat. No. 8,619,378 and is hereby incorporated by reference in its entirety.

This continuation-in-part patent application claims the benefit of and priority to U.S. patent application Ser. No. 13/247,898 filed Sep. 28, 2011 and entitled "MULTIPLE DEGREE OF FREEDOM ACTUATOR" which is hereby incorporated by reference in its entirety.

TECHNICAL FIELD

One or more embodiments of the invention relate generally to thermal compensation in imaging systems and more particularly, for example, to systems and methods for thermal despace compensation in optics assemblies including one or more lenses.

BACKGROUND

Imaging devices are being implemented with more and more features as consumer demand for such features increases over time. Many such features, such as autofocus and image stabilization, require multiple lenses and other optical devices to be integrated together into the imaging device. At the same time, the imaging devices are themselves being integrated into smaller and more portable electronics devices. As a result, such imaging devices experience wider temperature changes in typical use and, due the overall miniaturization, are more prone to optical defects related to thermal displacement of the various optical devices with respect to one another. One type of thermal displacement is referred to as thermal despace, which is a change in the separation between two or more optics devices, measured along a common optical axis, that is caused by a change in temperature of one or more of the optics devices and the imaging device.

Conventional methods used to address thermal despace, such as using actuator motion to compensate for the thermal displacement, are typically detrimental to operation of the imaging device. Relying on an actuator to compensate for thermal despace can limit the functionality of the imaging device and/or render the device inoperable at certain temperatures. Further, the additional actuator use can cause undue wear of the actuator and foreshorten the operable lifetime of the imaging device. Thus, there is a need for an improved methodology to address thermal despace compensation in optics assemblies.

SUMMARY

Techniques are disclosed for systems and methods to provide thermal despace compensation for optics assemblies, such as devices including one or more lenses and/or optical devices. In one embodiment, a thermal despace compensation system may include an interface situated substantially between optical devices that expand and contract with changing temperature according to their coefficients of thermal expansion (CTEs). Each interface may be implemented with one or more shapes and/or interfaces adapted to provide a compensation despace to reduce optical defects caused by changes in temperature of the optical devices.

In one embodiment, an optics assembly includes a lens having a first CTE; an optical device substantially aligned with the lens along an optical axis of the optics assembly and having a second CTE; and an interface between the lens and the optical device, where a physical shape of the interface is adapted to provide, at least in part, a compensation despace to reduce one or more optical defects caused by changes in a temperature of the optics assembly.

In another embodiment, a device includes an optics assembly having a first CTE; an image sensor substantially aligned with the optics assembly along an optical axis of the device and having a second CTE; and an interface between the optics assembly and the image sensor and/or disposed within the optics assembly, where a physical shape of the interface is adapted to provide, at least in part, a compensation despace to reduce one or more optical defects caused by changes in a temperature of the device.

In a further embodiment, a method includes providing a lens having a first CTE; providing an optical device having a second CTE; and assembling an optics assembly including the lens, the optical device, and an interface between the lens and the optical device, where a physical shape of the interface is adapted to provide, at least in part, a compensation despace to reduce one or more optical defects caused by changes in a temperature of the optics assembly.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, thermal despace compensation systems and methods may advantageously include an interface between optical devices that is shaped to provide a compensating offset (e.g., along an optical axis and between the optical devices) in response to changes in temperature of the optical devices. The compensating offset, which may be referred to as a compensation despace, at least partially compensates for despace variations due to the coefficients of thermal expansion (CTEs) of the optical devices and changes in temperature of the optical devices.

In one embodiment, a compensation despace may be adapted to substantially retain a separation of optical devices, for example. In another embodiment, a compensation despace may be adapted to reduce optical defects (e.g., caused and/or emphasized by various thermal despace variations) in an image processed and/or formed by the optical devices, such as an image projected onto and/or captured by an image sensor. Such optical defects may include defocusing, various types of optical aberration (e.g., monochromatic and/or chromatic aberration), various types of distortion (e.g., barrel, pincushion, and/or various radial and/or irregular distortions), and/or other optical defects caused and/or emphasized by thermal despace variations between one or more optical devices in an optics assembly, for example, or among and/or between a lens, an image sensor, various optics assemblies, and/or other components of a camera module.

In some embodiments, optical defects may include deviations of a processed image (e.g., and image created and/or transmitted by one or more optical devices) from a desired effect, such as a desired barrel or pincushion distortion effect, or a desired coma aberration effect, for example. In various embodiments, such optical defects may include any undesired thermal despace variations. A lens, optics device, optical assembly, and/or camera module may be considered to "process" an image when the component or group of components passes the image through the component or group of components, for example, and/or when the image is captured by an image sensor. For example, an optical aperture may "process" a visible light image by allowing a portion of the image (e.g., light of the image restricted by a diameter of the optical aperture) through the optical aperture.

Figure 1:
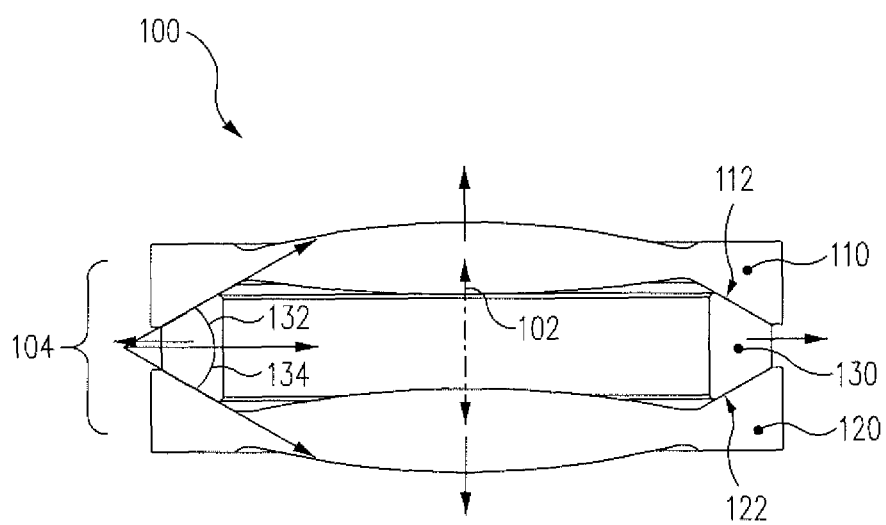
FIG. 1 illustrates a cross section view of a thermal despace compensation system in accordance with an embodiment of the disclosure.

FIG. 1 illustrates a cross section view of a thermal despace compensation system 100 in accordance with an embodiment of the disclosure. In the embodiment shown in FIG. 1, system 100 includes lens 110, optical device 120, and spacer 130 arranged substantially symmetrically with respect to optical axis 102. For example, optical device 120 may be substantially aligned with lens 110 along optical axis 102 of system 100. Also shown are conical interface 112 formed in lens 110 and spacer 130 and having an interface angle 132, and conical interface 122 formed in optical device 120 and spacer 130 and having an interface angle 134. In one embodiment, interface 104 between lens 110 and optical device 120 includes spacer 130 and the various conical interfaces formed in lens 110, optical device 120, and spacer 130. In various embodiments, thermal despace compensation system 100 may correspond to an optics assembly.

Lens 110 may be implemented as a substantially spherical, cylindrical, or other type of optical lens, for example, that includes an index of refraction, an optical axis, and a CTE. In one embodiment, lens 110 and conical interface 112 of lens 110 may formed out of single material, such as glass, various thermoplastics (e.g., Zeonex), polymers, and other materials, for example, through one or more of grinding, etching, injection molding, casting, polishing, and/or other lens formation techniques. In other embodiments, such formation techniques may be used to form lens 110 and/or conical interface 112 of lens 110 from a variety of materials, for example, that may be coupled to each other through an adhesive (e.g., epoxy), soldering, a mechanical clamp and/or spring, and/or other bonding techniques. In various embodiments, conical interface 112 of lens 110 may be formed from a material adapted to mate with and/or slide relative to conical interface 112 of spacer 130.

Optical device 120 may be implemented as one or more of a lens (e.g., similar to lens 110), an adjustable aperture, a filter, a mirror, an image sensor, an actuator module, a separate optics assembly, and/or another type of optical device, for example, that includes an optical and/or symmetry axis and a CTE. In embodiments where optical device 120 includes multiple modules and/or devices, its CTE may correspond to a cumulative response of the multiple modules and/or devices to a change in temperature of the optical device. Conical interface 122 of optical device 110 may be formed from a variety of materials, for example, using any of the techniques described herein. In various embodiments, conical interface 122 of optical device 120 may be formed from a material adapted to mate with and/or slide relative to conical interface 122 of spacer 130.

Spacer 130 may be implemented as a substantially circular ring, for example, that includes a CTE and a symmetry axis corresponding to an optical axis (e.g., of lens 110, for example). In some embodiments, spacer 130 and/or conical interfaces 112 and 122 of spacer 130 may be formed from any one or combination of materials used to form lens 110. In other embodiments, spacer 130 and/or conical interfaces 112 and 122 of spacer 130 may be formed from mild steel. In various embodiments, conical interfaces 112 and 122 of spacer 130 may be formed from one or more materials adapted to mate with and/or slide relative to conical interface 112 of lens 110 and/or conical interface 122 of optical device 120.

As shown in FIG. 1, temperature induced changes in a vertical separation (e.g., along optical axis 102) between lens 110 and optical device 120 depends, at least in part, on their individual CTEs and thicknesses at interfaces 112 and 122. However, the physical shape of interface 104 also influences the vertical separation, and its shape can be adapted to provide a compensation despace that substantially reduces and/or eliminates a thermal dependence of the vertical separation, for example, and/or that substantially reduces optical defects caused by changes in a temperature of system 100.

For example, in one embodiment, a CTE of spacer 130 may be selected such that during a temperature decrease (e.g., where a vertical separation of lens 110 and optical device 120 typically decreases), lens 110 contracts radially faster than spacer 130. In that embodiment, interface angle 132 may be selected so that the relative motion of lens 110 and spacer 130 (e.g., in response to the change in temperature of system 100) results in an increase in vertical separation (e.g., a compensation despace) that is substantially the same as the temperature induced decrease in vertical separation caused by thermal contraction of a thickness of lens 110 and/or spacer 130. In similar fashion, interface angle 134 may be selected to that relative motion of optical device 120 and spacer 130 (e.g., in response to the change in temperature of system 100) results in an increase in vertical separation (e.g., a compensation despace) that substantially compensates for the temperature induced decrease in vertical separation caused by thermal contraction of a thickness of optical device 120 and/or spacer 130.

Interface angles 132 and 134 may or may not be different from each other, for example, and may be selected to effect a particular partial or total compensation despace based on various characteristics of system 100, such as an average radius (e.g., averaged over the surface of conical interfaces 112 and/or 122) and/or thickness of lens 110 and/or optical device 130, or various relative CTEs of lens 110, optical device 120, and spacer 130.

In various embodiments, optical defects in images processed by system 100 (e.g., that are caused by changes in a temperature of system 100), such as defocusing, aberration, and/or other optical defects caused by physical de-location due to thermal expansion and/or contraction, may be reduced by a compensation despace adapted to reduce and/or eliminate a thermal dependence of the vertical separation between lens 110 and optical device 120. In other embodiments, system 100 may be adapted to provide a compensation despace to reduce optical defects in a larger device. In such embodiments, one or more of interface angles 132 and 134 and/or CTEs of lens 110, optical device 120, and spacer 130 may be selected to increase a thermal dependence of the vertical separation, for example, in order to reduce optical defects experienced by the larger device.

For example, system 100 may form a portion of a larger device used to capture images, but the remaining portions of the larger device may not include an interface similar to interface 104 that can provide an appropriate compensation despace for the larger device as a whole. In such embodiments, a physical shape of interface 104, in addition to the various CTEs of lens 110, optical device 120, and spacer 130, may be adapted to provide, at least in part, a compensation despace selected to reduce one or more optical defects caused by changes in a temperature of system 100 and/or the larger device. In some embodiments, such compensation despace may be selected to increase and/or decrease a vertical separation of lens 110 and optical device 120, as a function of temperature, in order to reduce optical defects with respect to the larger device as a whole.

Figure 2:
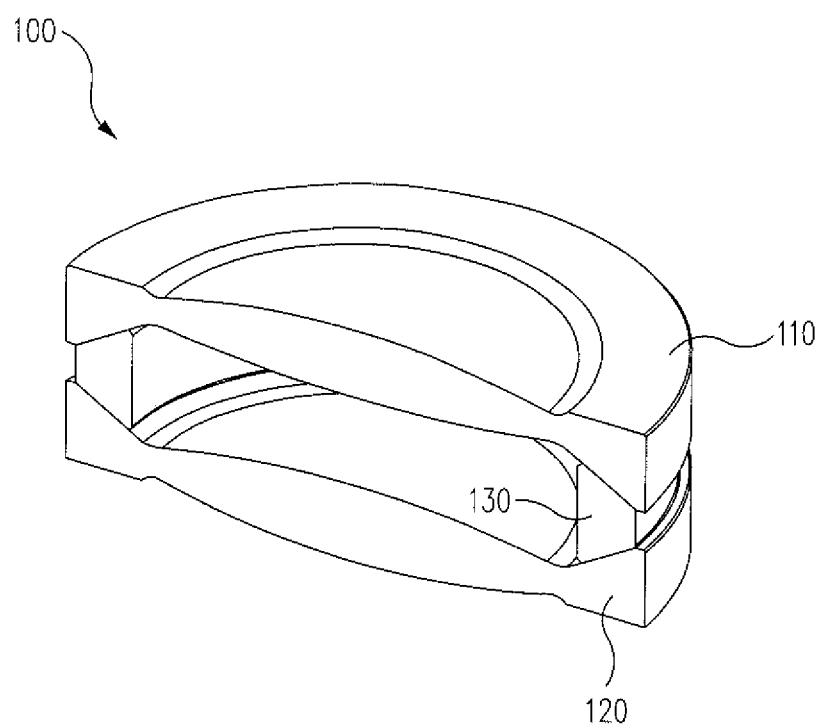
FIG. 2 illustrates a perspective view of the thermal despace compensation system of FIG. 1 in accordance with an embodiment of the disclosure.

FIG. 2 illustrates a perspective view of the thermal despace compensation system 100 of FIG. 1 in accordance with an embodiment of the disclosure. As shown in FIG. 2, elements of system 100 may be substantially symmetrical about an optical axis of system 100. For example, optical device 120 may be substantially aligned with lens 110 along an optical axis (e.g., optical axis 102 in FIG. 1) of system 100. In some embodiments, a physical shape of interface 104 (e.g., including spacer 130 in FIG. 2) may be adapted to provide such alignment along with a compensation despace, as described herein.

Figure 3:
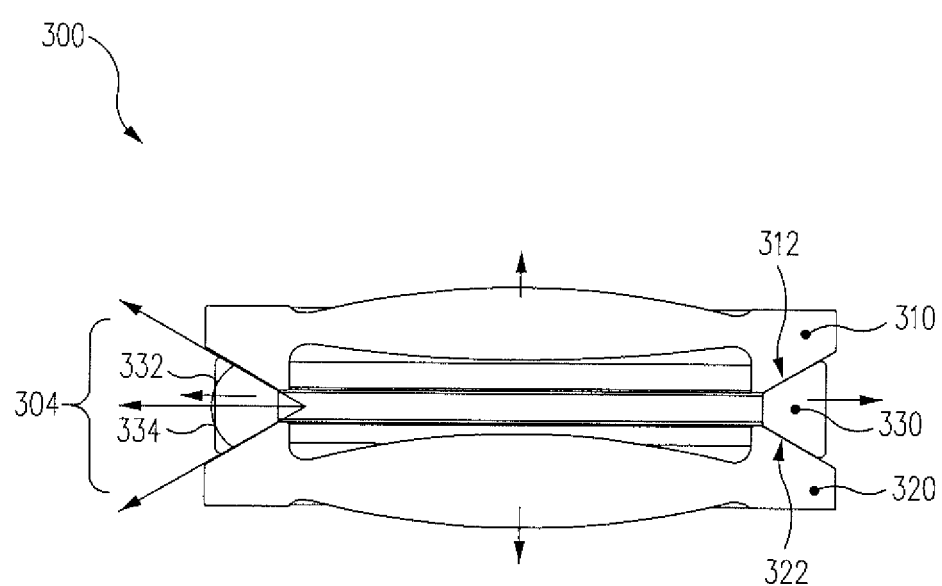
FIG. 3 illustrates a cross section view of a thermal despace compensation system in accordance with an embodiment of the disclosure.

FIG. 3 illustrates a cross section view of a thermal despace compensation system 300 in accordance with an embodiment of the disclosure. In the embodiment shown in FIG. 3, system 300 includes lens 310, optical device 320, and spacer 330 arranged substantially symmetrically with respect to an optical axis. For example, optical device 320 may be substantially aligned with lens 310 along an optical axis of system 300. Also shown are conical interface 312 formed in lens 310 and spacer 330 and having an interface angle 332, and conical interface 322 formed in optical device 320 and spacer 330 and having an interface angle 334. In one embodiment, interface 304 between lens 310 and optical device 320 includes spacer 330 and the various conical interfaces formed in lens 310, optical device 320, and spacer 330. In various embodiments, thermal despace compensation system 300 may correspond to an optics assembly.

Lens 310, optical device 320, and spacer 330 of system 300 may roughly correspond to lens 110, optical device 120, and spacer 130 of system 100, for example, and may be formed and/or operate similarly. In the embodiment shown in FIG. 3, spacer 330 may be implemented with a CTE that is larger than the CTE of lens 310 and/or optical device 330. For example, in one embodiment, a CTE of spacer 330 may be selected such that during a temperature increase (e.g., where a vertical separation of lens 310 and optical device 320 typically increases), lens 310 and/or optical device 320 expand radially slower than spacer 330. In that embodiment, interface angles 332 and/or 334 may be selected so that the motion of lens 310 and/or optical device 320 relative to spacer 330 (e.g., in response to the change in temperature of system 100) results in a decrease in vertical separation (e.g., a compensation despace) that is substantially the same as the temperature induced increase in vertical separation caused by thermal expansion of the thicknesses of lens 310, optical device 320, and/or spacer 330.

In various embodiments, optical defects in images processed by system 300 may be reduced by a compensation despace adapted to reduce and/or eliminate a thermal dependence of the vertical separation between lens 310 and optical device 320. In other embodiments, system 300 may be adapted to provide a compensation despace to reduce optical defects in a larger device, for example, where one or more of interface angles 332 and 334 and/or CTEs of lens 310, optical device 320, and spacer 330 may be selected to increase a thermal dependence of the vertical separation and reduce optical defects experienced by the larger device.

Interface angles 332 and 334 may or may not be different from each other, for example, and may be selected to produce a particular partial or total compensation despace based on various characteristics of system 300, such as an average radius (e.g., averaged over the surface of conical interfaces 312 and/or 322) and/or thickness of lens 310 and/or optical device 330, or various relative CTEs of lens 310, optical device 320, and spacer 330.

In various embodiments, interface angles 332 and 334 of FIG. 3 may be referred to as positive conical interface angles, for example, and interface angles 132 and 134 of FIG. 1 may be referred to as negative conical interface angles. In some embodiments, spacer 330 may be implemented with a CTE that is larger than the CTE of lens 310 but smaller than the CTE of optical device 320. In such embodiments, interface 312 may be implemented with a positive conical interface angle, such as interface angle 312, and interface 322 may be implemented with a negative conical interface angle, such as interface angle 134 in FIG. 1. Thus, embodiments of the present disclosure may be formed of one or more lenses, optical devices, and/or spacers selected from a relatively broad selection of materials and/or CTEs.

In one embodiment, optical device 320 may be implemented as a lens similar in shape, material, and size to lens 310, and interface angle 332 may be the same size as interface angle 334. To illustrate a real-world embodiment, an average radius of lens 310, optical device 320, and spacer 330 may be 2.5 mm, a vertical separation of lens 310 and optical device 320 (e.g., measured from their optical centers) at 20° C. may be 1.5 mm, lens 310 and optical device (lens) 320 may be formed from Zeonex (CTE=9.0e-5/° C.), and spacer 330 may be formed from mild steel (CTE—1.51e-5/° C.). A change in temperature of 30° C. in an imaging system utilizing a similar optics assembly requires a compensation despace (e.g., provided by an autofocus actuator) of 0.010 mm (e.g., bringing lens 310 and optical device 330 closer together) to maintain focus. To provide the same compensation despace using only interface angle 332, the following equation may be used:

$$2*\text{TAN}(\theta)*\Delta T*R*\Delta\text{CTE}=0.010;$$

where θ=interface angle 332; ΔT=the change in temperature of system 300; R=the average radius of lens 310, optical device (lens) 320, and spacer 330; and ΔCTE=the difference in CTE between spacer 330 and lens 310/optical device 320. From the equation, a corresponding interface angle 332 is approximately 41 degrees.

Figure 4:
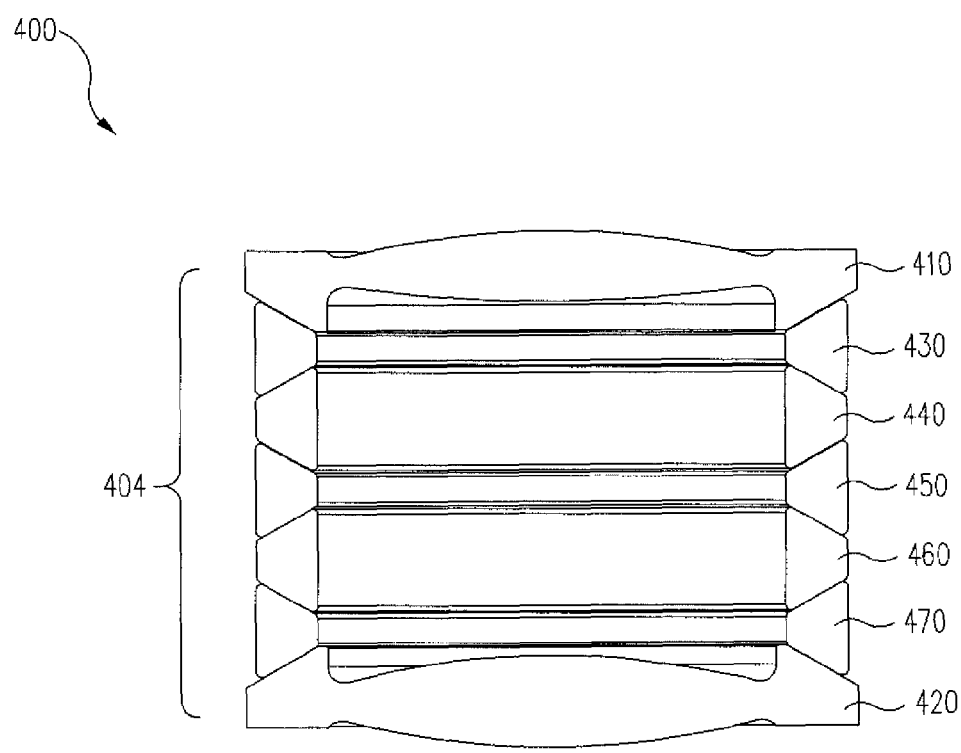
FIG. 4 illustrates a cross section view of a thermal despace compensation system in accordance with an embodiment of the disclosure.

FIG. 4 illustrates a cross section view of a thermal despace compensation system 400 in accordance with an embodiment of the disclosure. In the embodiment shown in FIG. 4, system 400 includes lens 410, optical device 420, and spacers 430-470 arranged substantially symmetrically with respect to an optical axis of system 400. For example, optical device 420 may be substantially aligned with lens 410 along an optical axis of system 400. Also shown are various conical interfaces having a variety of positive and negative conical interface angles formed in lens 410, optical device 420, and spacers 430-470. In one embodiment, interface 404 between lens 410 and optical device 420 includes spacers 430-470 and the various conical interfaces formed in lens 410, optical device 420, and spacers 430-470, which may be adapted to mate with and slide relative to each other in response to a change in temperature of system 400. In various embodiments, thermal despace compensation system 400 may correspond to an optics assembly.

Lens 410, optical device 420, and spacers 430-470 of system 400 may roughly correspond to lens 110, optical device 120, and spacer 130 of system 100, for example, and may be formed and/or operate similarly. In one embodiment, spacers 430, 450, 470 may be implemented with the same first CTE, and spacers 440, 460 may be implemented with the same second CTE that is different from the first CTE. In such embodiment, the positive and negative conical interface angles may be selected to increase and/or decrease a total compensation despace provided by interface 404. As such, system 400 illustrates an embodiment of the present disclosure that can be adapted to provide a relatively large compensation despace according to a need of system 400, for example, or a need of a larger device containing system 400.

Figure 5:
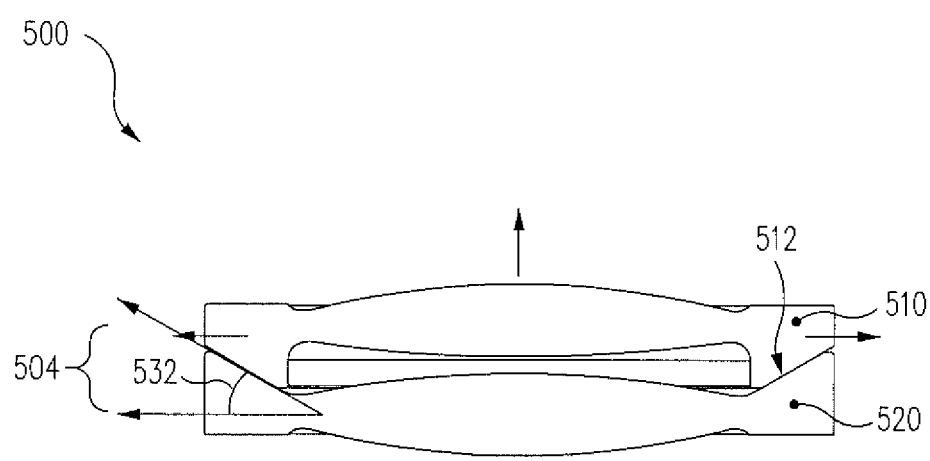
FIG. 5 illustrates a cross section view of a thermal despace compensation system in accordance with an embodiment of the disclosure.

FIG. 5 illustrates a cross section view of a thermal despace compensation system 500 in accordance with an embodiment of the disclosure. In the embodiment shown in FIG. 5, system 500 includes lens 510 and optical device 520 arranged substantially symmetrically with respect to an optical axis of system 500. For example, optical device 520 may be substantially aligned with lens 510 along an optical axis of system 500. Also shown are conical interface 512 formed in lens 510 and optical device 520 and having an interface angle 532. In one embodiment, interface 504 between lens 510 and optical device 520 includes the conical interfaces formed in lens 510 and optical device 520, which may be adapted to mate with and slide relative to each other in response to a change in temperature of system 500. In various embodiments, thermal despace compensation system 500 may correspond to an optics assembly.

Lens 510 and optical device 520 of system 500 may roughly correspond to lens 110 and optical device 120 of system 100, for example, and may be formed and/or operate similarly. In one embodiment, lens 510 may be implemented with a first CTE, and optical device 520 may be implemented with a second CTE that is different from the first CTE. For example, in one embodiment, a CTE of lens 510 may be selected such that during a temperature increase (e.g., where a vertical separation of lens 510 and optical device 520 typically increases), lens 510 expands radially slower than optical device 520. In that embodiment, interface angle 532 may be selected so that the relative motion of lens 510 and optical device 520 (e.g., in response to the change in temperature of system 500) results in a decrease in vertical separation (e.g., a compensation despace) that is substantially the same as the temperature induced increase in vertical separation caused by thermal expansion of a thickness of lens 510 and/or spacer 530.

In various embodiments, optical defects in images processed by system 500 may be reduced by a compensation despace adapted to reduce and/or eliminate a thermal dependence of the vertical separation between lens 510 and optical device 520. In other embodiments, system 500 may be adapted to provide a compensation despace to reduce optical defects in a larger device, for example, where one or more of interface angle 532 and/or CTEs of lens 510 and optical device 520 may be selected to increase a thermal dependence of the vertical separation and reduce optical defects experienced by the larger device.

Figure 6:
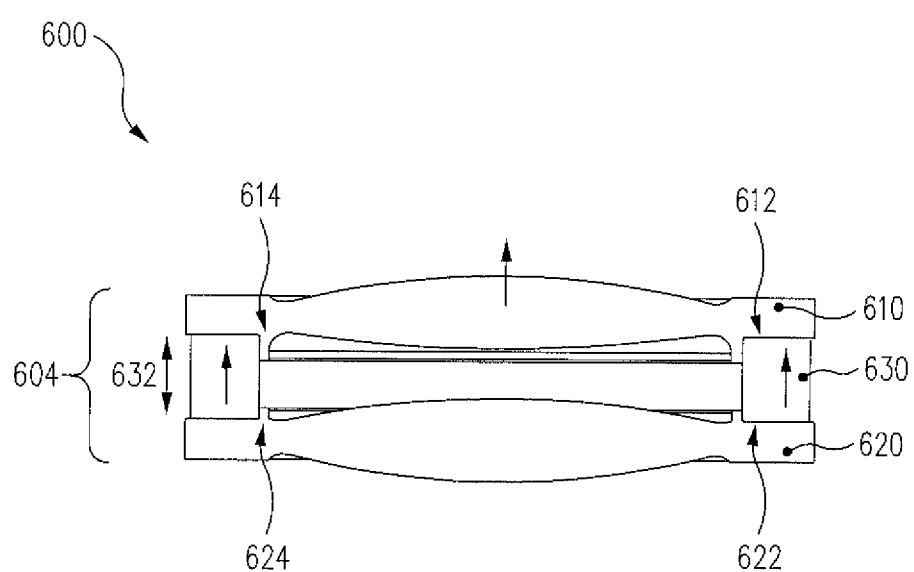
FIG. 6 illustrates a cross section view of a thermal despace compensation system in accordance with an embodiment of the disclosure.

FIG. 6 illustrates a cross section view of a thermal despace compensation system 600 in accordance with an embodiment of the disclosure. In the embodiment shown in FIG. 6, system 600 includes lens 610 and optical device 620 arranged substantially symmetrically with respect to an optical axis of system 600. For example, optical device 620 may be substantially aligned with lens 610 along an optical axis of system 600. Also shown are cylindrical interface 612 formed in lens 610 and spacer 630, and cylindrical interface 622 formed in optical device 620 and spacer 630. In one embodiment, interface 604 between lens 610 and optical device 620 includes the various cylindrical interfaces formed in lens 610, optical device 620, and spacer 630, which may be adapted to mate with each other as shown. In particular, the various cylindrical interfaces may not be required to slide relative to each other, which can increase the selection of materials available for system 600. In some embodiments, any of the various cylindrical interfaces described herein may alternatively be referred to and/or implemented as annular interfaces, for example, and/or have a predominately annular shape. As a specific example, a cylindrical interface (e.g., cylindrical interface 612 and/or 622) as used herein may represent and be implemented as an annular interface (or annularly-shaped interface), a cylindrical interface, or a similarly-shaped interface. In various embodiments, thermal despace compensation system 600 may correspond to an optics assembly.

Lens 610, optical device 620, and spacer 630 of system 600 may roughly correspond to lens 110, optical device 120, and spacer 130 of system 100, for example, and may be formed and/or operate similarly. In one embodiment, a shape of interface 604 (e.g., a shape of cylindrical interfaces 612 and 622 and/or spacer 630) may be adapted to provide a compensation despace to reduce one or more optical defects caused by changes in a temperature of system 600. For example, a shape of interface 604 may be selected such that the axial thickness 632 of spacer 630 (e.g., measured in a direction parallel to an optical axis of system 600) is substantially larger than the axial thickness of cylindrical interface 612 formed in lens 610 and cylindrical interface 622 formed in optical device 620 (e.g., the portions of lens 610 and optical device 620 above and below spacer 630). In such embodiment, the temperature induced changes in a vertical separation between lens 610 and optical device 620 is largely dependent on the CTE of spacer 630 because the relevant portions of lens 610 and optical device 620 are adapted to be too thin to substantially contribute to a thermal dependence of the vertical separation. Thus, the resulting compensation despace depends largely on the CTE of spacer 630, such as when spacer 630 expands or contracts in response to a change in temperature of system 600. In some embodiments, spacer 630 may be implemented with a negative CTE, for example.

In further embodiments, spacer 630 may be implemented with an anisotropic CTE, for example, where the anisotropy is substantially parallel to an optical axis of system 600. Such anisotropic CTE may be positive or negative, for example, and may be used to increase or decrease a compensation despace produced by system 600 in response to a change in temperature of system 600.

Figure 7:
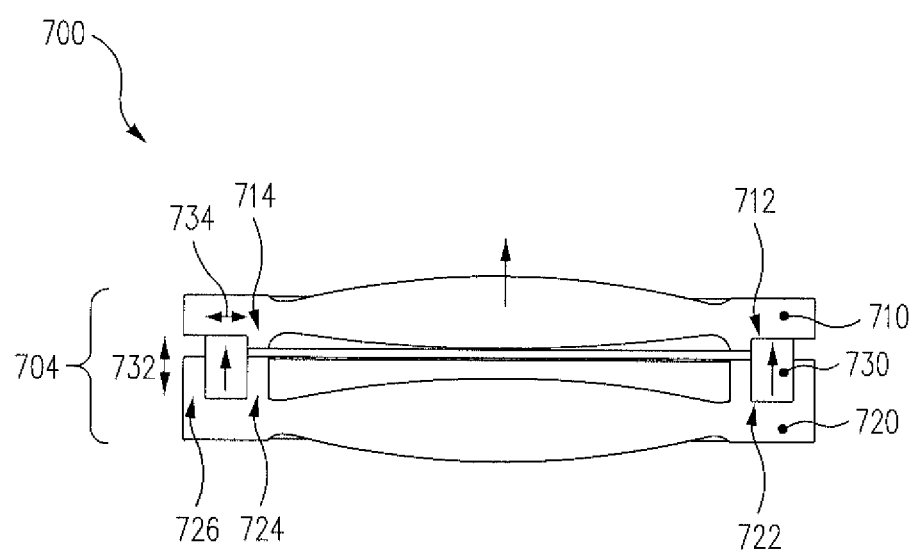
FIG. 7 illustrates a cross section view of a thermal despace compensation system in accordance with an embodiment of the disclosure.

FIG. 7 illustrates a cross section view of a thermal despace compensation system in accordance with an embodiment of the disclosure. In the embodiment shown in FIG. 7, system 700 includes lens 710 and optical device 720 arranged substantially symmetrically with respect to an optical axis of system 700. For example, optical device 720 may be substantially aligned with lens 710 along an optical axis of system 700. Also shown are cylindrical constraining interface 712 formed in lens 710, cylindrical interface 712 formed in spacer 730, cylindrical constraining interface 722 formed in optical device 720, and cylindrical interface 722 formed in spacer 730. In one embodiment, interface 704 between lens 710 and optical device 720 includes the various cylindrical and cylindrical constraining interfaces formed in lens 710, optical device 720, and spacer 730, which may be adapted to mate with each other as shown. In particular, the various cylindrical and cylindrical constraining interfaces may not be required to slide relative to each other, which can increase the selection of materials available for system 700. In various embodiments, thermal despace compensation system 700 may correspond to an optics assembly.

Lens 710, optical device 720, and spacer 730 of system 700 may roughly correspond to lens 610, optical device 620, and spacer 630 of system 600, for example, and may be formed and/or operate similarly. In one embodiment, a shape of interface 704 (e.g., a shape of cylindrical/constraining interfaces 712 and 722 and/or spacer 730) may be adapted to provide a compensation despace to reduce one or more optical defects caused by changes in a temperature of system 700.

For example, a shape of interface 704 may be selected such that the axial thickness 734 of spacer 730 is substantially larger than the axial thickness of cylindrical constraining interface 712 formed in lens 710 and cylindrical constraining interface 722 formed in optical device 720. In such embodiment, the temperature induced changes in a vertical separation between lens 710 and optical device 720 is largely dependent on the CTE of spacer 730 because the relevant portions of lens 710 and optical device 720 are adapted to be too thin to substantially contribute to a thermal dependence of the vertical separation. Thus, the resulting compensation despace depends largely on the CTE of spacer 730, such as when spacer 730 expands or contracts in response to a change in temperature of system 700.

In related embodiments, cylindrical constraining interface 712 formed in lens 710 may include inner lip 714, and cylindrical constraining interface 722 formed in optical device 720 may include inner and outer lips 724 and 725, for example, where the various lips are adapted to constrain expansion and contraction of spacer 730 to produce enhanced and substantially only vertical expansions and contractions in response to changes in temperature of system 700. In one embodiment, the cylindrical constraining interfaces may be adapted to force spacer 730 to respond as if it were implemented with an anisotropic CTE, similar to that described with respect to spacer 630 of FIG. 6. In such embodiments, a resulting compensation despace (e.g., when spacer 730 expands or contracts in the constrained interfaces in response to a change in temperature of system 700) may depend on radial thickness 734 of spacer 730 and/or the various cylindrical constraining interfaces, for example, in addition to the CTE of spacer 730.

In some embodiments, spacer 730 may be implemented with a negative CTE, for example. In further embodiments, spacer 730 may be implemented with an anisotropic CTE (e.g., in addition to that imposed by the cylindrical constraining interfaces), for example, where the anisotropy is substantially parallel to an optical axis of system 700. Such anisotropic CTE may be positive or negative, for example, and may be used to increase or decrease a compensation despace produced by system 700 in response to a change in temperature of system 700.

Figure 8:
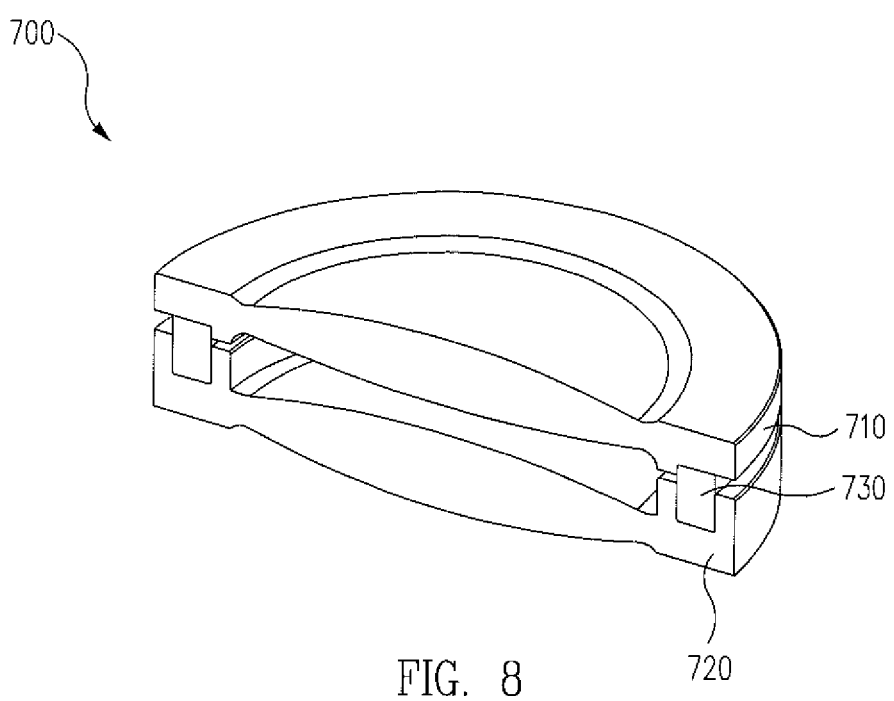
FIG. 8 illustrates a perspective view of the thermal despace compensation system of FIG. 7 in accordance with an embodiment of the disclosure.

FIG. 8 illustrates a perspective view of the thermal despace compensation system 700 of FIG. 7 in accordance with an embodiment of the disclosure. As shown in FIG. 8, elements of system 700 may be substantially symmetrical about an optical axis of system 700. For example, optical device 720 may be substantially aligned with lens 710 along an optical axis of system 700. In some embodiments, a physical shape of interface 704 (e.g., including spacer 730 in FIG. 7) may be adapted to provide such alignment along with a compensation despace, as described herein.

It should be appreciated that although system 700 shows spacer 730 including only cylindrical interfaces, in alternative embodiments, spacer 730 may be implemented with a cylindrical interface to lens 710, for example, and a conical interface to optical device 720. More generally, it is contemplated that any features of any of the interfaces and/or thermal despace compensation systems described herein may be combined in arrangements not explicitly shown in FIGS. 1-9 to provide a compensation despace tailored to a particular system arrangement. Furthermore, although the various optical devices, spacers, and lenses depicted in FIGS. 1-8 have a circular perimeter, it is contemplated that in other embodiments, one or more of a lens, optical device, optics assembly, spacer, interface, or other component or components of a thermal despace compensation system could have non-circular perimeter, for example, such as an elliptical or rectangular perimeter.

Figure 9:
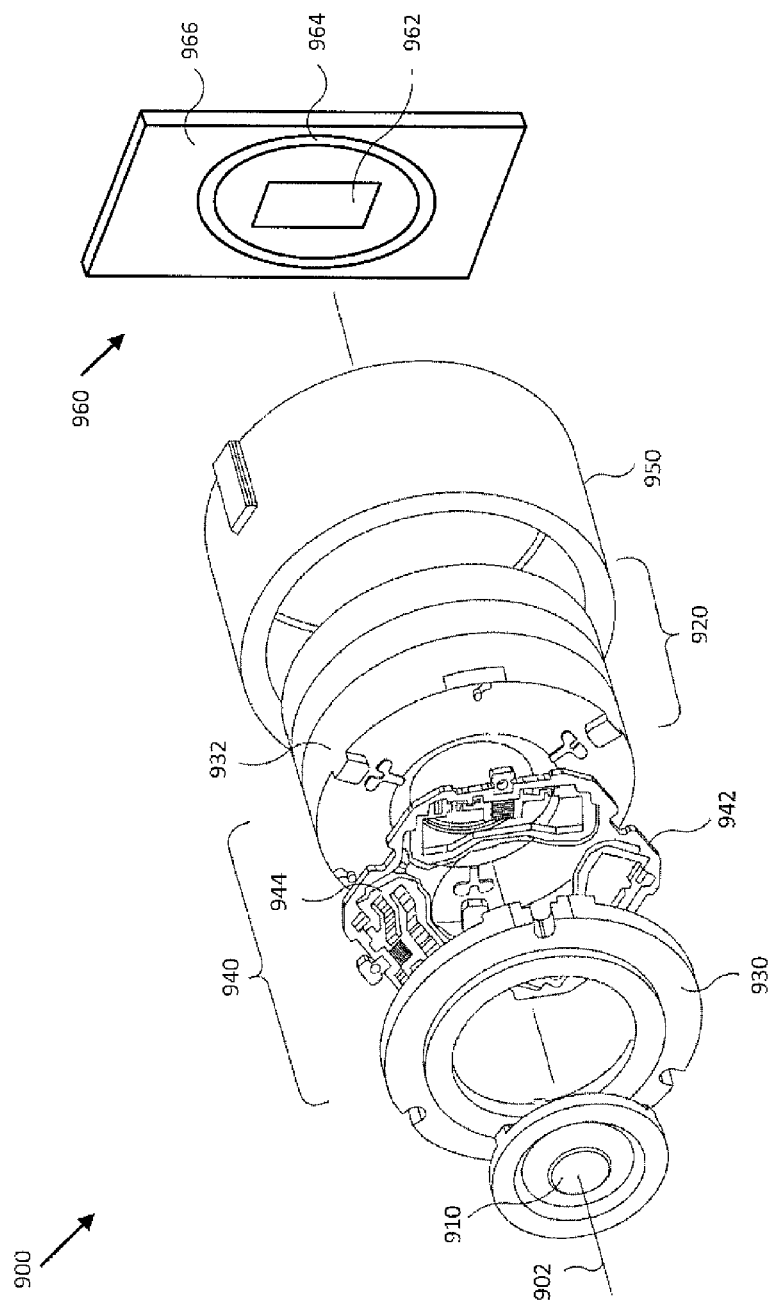
FIG. 9 illustrates an exploded perspective view of a thermal despace compensation system in accordance with an embodiment of the disclosure.

FIG. 9 illustrates an exploded perspective view of a thermal despace compensation system 900 in accordance with an embodiment of the disclosure. System 900 may correspond to a camera module, for example, which can be integrated with (e.g., electrically coupled to, soldered to, mechanically coupled to) a digital camera, a smartphone, a personal digital assistant, a tablet computer, a notebook computer, a kiosk (e.g., a sales kiosk, an ATM, and/or other types of kiosks), a portable electronic device, and/or other electronic devices, for example. In one embodiment, portions of system 900 may be implemented according to various techniques, structures, arrangements, and other methodologies set forth in U.S. patent application Ser. No. 12/946,515 filed Nov. 15, 2010 which is incorporated herein by reference in its entirety. In another embodiment, portions of system 900 may be implemented according to various techniques, structures, arrangements, and other methodologies set forth in U.S. patent application Ser. No. 13/247,898 filed Sep. 28, 2011 which is incorporated herein by reference in its entirety.

In the embodiment shown in FIG. 9, system 900 includes moveable lens 910, optical device 940, optics assembly 920, and image sensor 960 substantially aligned with each other along optical axis 902 of system 900. As shown in FIG. 9, moveable lens 910, optical device 940, optics assembly 920, and/or at least a portion of image sensor 960 may be housed by lens barrel 950.

Image sensor 960 may be implemented as a charge-coupled device (CCD) sensor, a complementary metal-oxide-semiconductor (CMOS) sensor, and/or as various other types of image sensors, for example. In some embodiments, image sensor 960 may include an active area 962 formed, at least in part, on a printed circuit board (PCB) 966. In further embodiments, image sensor 960 may be implemented with interface 964, for example, which may be used to implement any portion of a thermal despace compensation system, as described herein, such as conical and/or cylindrical interfaces.

As shown in FIG. 9, optical device 940 may include microelectromechanical systems (MEMS) device 942 supported and/or protected by upper cover/spacer 930 and lower cover/spacer 932. In one embodiment, MEMS device 942 may include one or more actuators 944. In related embodiments, spacers 930 and/or 932 may be implemented according to any portion of a thermal despace compensation system, as described herein, such as spacers including CTEs and/or conical or cylindrical interfaces adapted to provide compensation despace to reduce optical defects caused by changes in a temperature of optical device 940 and/or any other components of system 900. A CTE of optical device 940 may correspond to a cumulative response of the multiple modules and/or devices of optical device 940 to a change in temperature of optical device 940.

Optics assembly 920 may be implemented with a number of lenses, spacers, and other various optics devices, for example. In some embodiments, spacer 932 may be adapted to operate as an interface between optics assembly 920 and MEMS device 942, for example, where a shape of spacer 932 is adapted to provide, at least in part, a compensation despace to reduce one or more image defects caused by changes in a temperature of optics assembly 920, lens barrel 950, and/or system 900. In various embodiments, other components of system 900 may be adapted to operate as an interface providing a compensation despace to reduce one or more image defects caused by changes in a temperature of system 900. A CTE of optics assembly 920 may correspond to a cumulative response of the multiple modules and/or devices of optics assembly 920 to a change in temperature of optics assembly 920.

In some embodiments, lens barrel 950 may be adapted to thermalize any of the lenses, optical devices, optics assemblies, spacers, interfaces, and/or other components of system 900. For example, lens barrel 950 may be implemented in a thermally conductive material to passively thermalize components within and/or adjacent to lens barrel 950. In other embodiments, lens barrel 950 may be implemented with a heater (e.g., a resistive heater, for example) and/or a thermal sensor adapted to actively thermalize components within and/or adjacent to lens barrel 950.

Figure 10:
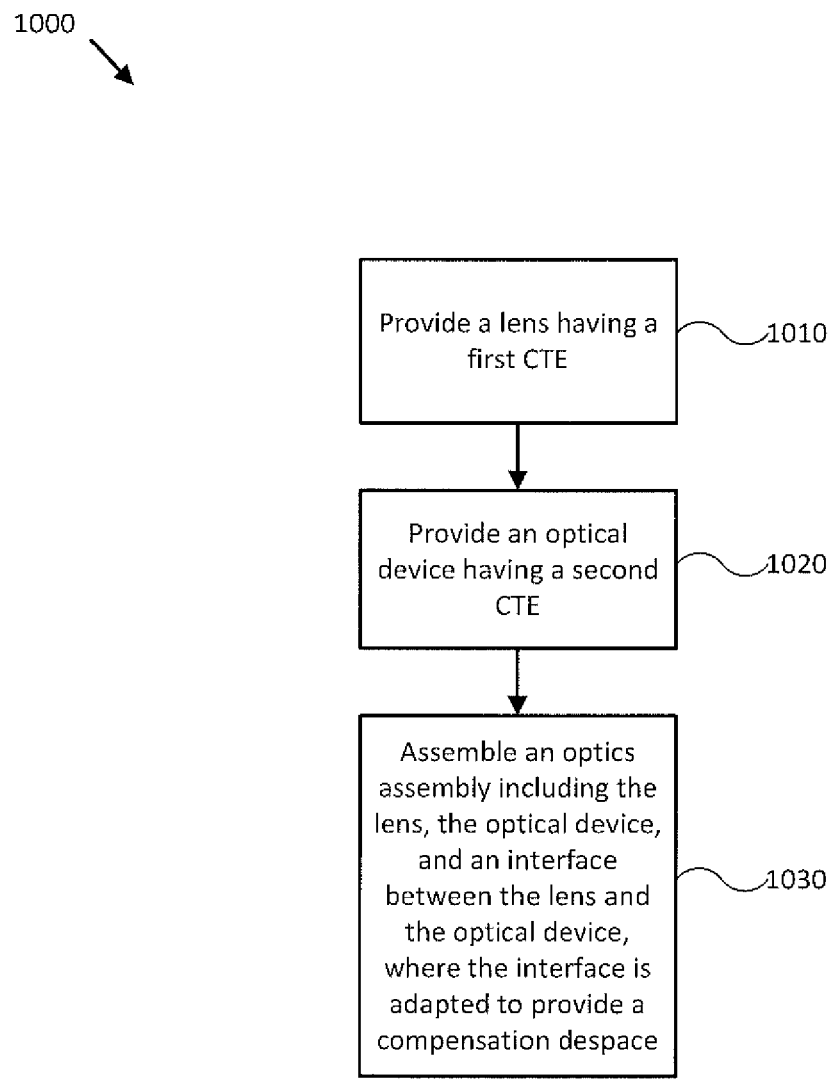
FIG. 10 illustrates a flow diagram of various operations to provide thermal despace compensation in accordance with an embodiment of the disclosure.

FIG. 10 illustrates a flow diagram of process 1000 to provide thermal despace compensation in accordance with an embodiment of the disclosure. In some embodiments, the operations of FIG. 10 may be implemented as software instructions executed by one or more logic devices used to implement a fabrication and/or assembly process. More generally, the operations of FIG. 10 may be implemented with any combination of software instructions, electronic hardware (e.g., inductors, capacitors, amplifiers, or other analog and/or digital components), and/or mechanical hardware used in a fabrication and/or assembly process, such as a MEMS fabrication process. It should be appreciated that any step, sub-step, sub-process, or block of process 1000 may be performed in an order or arrangement different from the embodiment illustrated by FIG. 10. Further, in some embodiments, any number of processes similar to process 1000 may be performed substantially simultaneously to produce multiple instances of thermal despace compensation systems throughout a camera module, for example. Although process 1000 is described with reference to system 100, process 1000 may be performed according to systems different from system 100 and including a different selection of optical and/or despace requirements.

In block 1010, a thermal despace compensation system assembly process includes providing a lens having a first CTE. For example, in one embodiment, a fabrication and/or assembly system may be adapted to provide lens 110 by forming conical interface 112 in lens 110. In some embodiments, lens 110 and/or conical interface 112 in lens 110 may be formed from one or more materials (e.g., glass, various thermoplastics, polymers, and other materials), using a variety of grinding, etching, injection molding, casting, polishing, other lens formation techniques, and/or other fabrication processes, for example. In various embodiments, block 1010 may be performed substantially simultaneously with process steps used to form other interfaces in lens 110 and/or provide other optical devices, for example. In some embodiments, block 1010 may be implemented to produce lens 110 according to a particular desired CTE.

In block 1020, a thermal despace compensation system assembly process includes providing an optical device having a second CTE. For example, in one embodiment, a fabrication and/or assembly system may be adapted to provide optical device 120 by forming conical interface 122 in optical device 120. In some embodiments, optical device 120 and/or conical interface 122 in optical device 120 may be formed from one or more materials (e.g., glass, various thermoplastics, polymers, and other materials), using a variety of grinding, etching, injection molding, casting, polishing, and/or other fabrication processes, for example. In various embodiments, block 1020 may be performed substantially simultaneously with process steps used to form other interfaces in optical device 120 and/or provide other optical devices, for example. In some embodiments, block 1020 may be implemented to produce optical device 120 according to a particular desired CTE.

In block 1030, a thermal despace compensation system assembly process includes assembling an optics assembly including the lens, the optical device, and an interface between the lens and the optical device, where the interface is adapted to provide a compensation despace. For example, in one embodiment, a fabrication and/or assembly system may be adapted to assemble system 100 by providing interface 104, which may include providing spacer 130 and/or forming conical interfaces 112 and 122 in spacer 130, where conical interfaces 112 and 122 in spacer 130 are adapted to mate with and slide relative to conical interface 112 in lens 110 and conical interface 122 in optical device 120.

In some embodiments, spacer 130 and/or conical interfaces 112 and 122 in spacer 130 may be formed from mild steel, any one or combination of materials used to form lens 110, and/or one or more materials adapted to mate with and/or slide relative to conical interface 112 of lens 110 and/or conical interface 122 of optical device 120. Spacer 130 and/or conical interfaces 112 and 122 in spacer 130 may be formed using a variety of grinding, etching, injection molding, casting, polishing, milling, machining, and/or other fabrication processes, for example. In various embodiments, block 1030 may be performed substantially simultaneously with process steps used to form and/or provide other interfaces in other spacers and/or optical devices, for example. In some embodiments, block 1030 may be implemented to produce spacer 130 according to a particular desired CTE, for example, and/or to produce interface 104 according to a particular desired compensation despace. In various embodiments, a physical shape of interface 104 may be adapted to provide, at least in part, a compensation despace to reduce one or more optical defects caused by changes in a temperature of system 100.

In additional embodiments, a fabrication and/or assembly system may be adapted to assemble system 100 by placing spacer 130 on optical device 120 and lens 110 on spacer 130 so that conical interfaces 112 and 122 in spacer 130 mate with conical interface 112 in lens 110 and conical interface 122 in optical device 120. In some embodiments, such assembly may be performed by a pick and place machine.

In related embodiments, such assembly may include allowing lens 110, optical device 120, and spacer 130 to self-align to a common optical axis using, for example, one or more of conical interfaces 112 and 122. In particular, such assembly may include a process step, such as a vibration step, a manipulation step, a press step, or a process pause, for example, providing for and/or allowing lens 110, optical device 120, and/or interface 104 to self-align to a common optical axis 102 and according to a physical shape of interface 104.

As described herein, characteristics of the various interfaces and CTEs may be selected to provide a compensation despace to reduce one or more optical defects caused by changes in a temperature of system 100. In various embodiments, block 1040 may be performed substantially simultaneously with process steps used to assemble other optics assemblies, for example.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An optics assembly comprising:
a lens with a first coefficient of thermal expansion (CTE) and comprising a first interface;
an optical device, substantially aligned with the lens along an optical axis of the optics assembly, with a second CTE and comprising a second interface; and
at least one spacer arranged between the lens and the optical device and comprising a third interface that mates with and slides on adapted to mate with and slide relative to the first interface of the lens and a fourth interface that mates with and slides on adapted to mate with and slide relative to the second interface of the optical device, such that the at least one spacer is configured to slide relative to the lens and the optical device to provide, at least in part, a compensation despace to reduce one or more optical defects caused by changes in a temperature of the optics assembly.

2. The optics assembly of claim 1, wherein:
the lens comprises a first lens; and
the optical device comprises one or more of an adjustable aperture, a filter, a mirror, a second lens, an image sensor, an actuator module, or another optics assembly.

3. The optics assembly of claim 1, wherein:
the one or more optical defects comprise a defocusing or an aberration of images processed by the optics assembly.

4. The optics assembly of claim 1, wherein:
the first and second CTEs are different;
the optics assembly further comprises a first conical interface formed in the lens and a second conical interface formed in the optical device that mates with and slides on is adapted to mate with and slide relative to the first conical interface; and
an interface angle of the first and second conical interfaces is selected to provide the compensation despace when the first and second interfaces slide relative to each other in response to a change in temperature of the optics assembly.

5. The optics assembly of claim 1, wherein:
the at least one spacer comprises a third CTE; and
the first, second, third, and fourth interfaces are conical interfaces;
a first interface angle of the first and third conical interfaces, a second interface angle of the second and fourth conical interfaces, and the third CTE are selected to provide the compensation despace when the first and third interfaces slide relative to each other and/or the second and fourth interfaces slide relative to each other in response to a change in temperature of the optics assembly.

6. The optics assembly of claim 1, wherein:
a plurality of spacers are provided to be situated between the lens and the optical device and comprise a corresponding plurality of CTEs;
the plurality of spacers comprise a plurality of conical interfaces that mate with and slide on adapted to mate with and slide relative to each other, the first interface, and the second interface; and
a plurality of interface angles corresponding to the conical interfaces, and the plurality of CTEs, are selected to provide the compensation despace when the interfaces slide relative to each other in response to a change in temperature of the optics assembly.

7. The optics assembly of claim 1, wherein:
the at least one spacer comprising a third anisotropic CTE substantially aligned with the optical axis of the optics assembly;
the first, second, third, and fourth interfaces are cylindrical interfaces;
and
the third anisotropic CTE is selected to provide the compensation despace when the at least one spacer expands or contracts in response to a change in temperature of the optics assembly.

8. The optics assembly of claim 1, wherein:
the first and the second interfaces are cylindrical constraining interfaces having substantially the same radial thickness, and the at least one spacer comprises a third CTE;
the third and the fourth interfaces are cylindrical interfaces adapted to mate with the first and the second interfaces respectively; and
the radial thickness of the first and second cylindrical constraining interfaces and the third CTE are selected to provide the compensation despace when the at least one spacer expands or contracts in the constrained interfaces in response to a change in temperature of the optics assembly.

9. The optics assembly of claim 1, wherein:
the first interface of the lens is a conical interface and the second interface of the optical device is a cylindrical interface, and the at least one spacer comprises a third CTE;
the third interface is a conical interface and the fourth interface is a cylindrical interface; and
an interface angle of the first and second interfaces, and the third CTE, are selected to provide the compensation despace when the first and second conical interfaces slide relative to each other and/or the at least one spacer expands or contracts in response to a change in temperature of the optics assembly.

10. The optics assembly of claim 1, wherein:
the optics assembly forms part of a camera module.

11. The optics assembly of claim 10, wherein:
the camera module is integrated with a digital camera, a smartphone, a personal digital assistant, a computer, a tablet or notebook computer, a kiosk, or a portable electronic device.

12. A device comprising:
an optics assembly with a first coefficient of thermal expansion (CTE) and comprising a first interface;
an image sensor, substantially aligned with the optics assembly along an optical axis of the device with a second CTE and comprising a second interface; and
at least one spacer arranged between the optics assembly and the image sensor and/or disposed within the optics assembly, wherein the at least one spacer comprises a third interface that mates with and slides on adapted to mate with and slide relative to the first interface of the optics assembly and a fourth interface that mates with and slides on adapted to mate with and slide relative to the second interface of the image sensor, such that the at least one spacer is configured to slide relative to the optics assembly and the image sensor to provide, at least in part, a compensation despace to reduce one or more optical defects caused by changes in a temperature of the device.

13. The device of claim 12, further comprising a lens barrel adapted to house the optics assembly, wherein:
the lens barrel is adapted to substantially thermalize the device.

14. The device of claim 12, wherein:
the one or more optical defects comprise a defocusing or an aberration of images captured by the image sensor.

15. The device of claim 12, wherein:
the optics assembly comprises a plurality of optical devices; and
the first CTE corresponds to a cumulative response of the plurality of optical devices to a change in temperature of the optics assembly.

16. The device of claim 12, wherein:
the first and second CTEs are different;
the device further comprises a first conical interface formed in the optics assembly and a second conical interface formed in the image sensor that is adapted to mate with and slide relative to the first conical interface; and
an interface angle of the first and second conical interfaces is selected to provide the compensation despace when the first and second interfaces slide relative to each other in response to a change in temperature of the device.

17. The device of claim 12, wherein:
the at least one spacer comprising a third CTE;
the first, second, third, and fourth interfaces are conical interfaces; and
a first interface angle of the first and third conical interfaces, a second interface angle of the second and fourth conical interfaces, and the third CTE are selected to provide the compensation despace when the first and third interfaces slide relative to each other and/or the second and fourth interfaces slide relative to each other in response to a change in temperature of the device.

18. The device of claim 12, wherein:
a plurality of spacers are provided to be situated between the optics assembly and the image sensor and comprising a corresponding plurality of CTEs;
the first and second interfaces are conical interfaces;
the plurality of spacers comprise a plurality of conical interfaces that mate with and slide on adapted to mate with and slide relative to each other, the first interface, and the second interface; and
a plurality of interface angles corresponding to the conical interfaces, and the plurality of CTEs, are selected to provide the compensation despace when the interfaces slide relative to each other in response to a change in temperature of the device.

19. The device of claim 12, wherein:
the at least one spacer comprises a third anisotropic CTE substantially aligned with the optical axis of the device;
the first, second, third, and fourth interfaces are cylindrical interfaces;

and
the third anisotropic CTE is selected to provide the compensation despace when the at least one spacer expands or contracts in response to a change in temperature of the device.

20. The device of claim 12, wherein:
the first and second interfaces are cylindrical constraining interfaces with substantially the same radial thickness, and the at least one spacer comprising a third CTE;
the third and fourth interfaces are cylindrical interfaces that mate with adapted to mate with the first and the second interfaces respectively; and
the radial thickness of the first and second interfaces and the third CTE are selected to provide the compensation despace when the at least one spacer expands or contracts in the constrained interfaces in response to a change in temperature of the device.

21. The device of claim 12, wherein:
the first interface of the optics assembly is a conical interface and the second interface of the image sensor is a cylindrical interface, and the at least one spacer comprising a third CTE;
the third interface is a conical interface and the fourth interface is a cylindrical interface; and
an interface angle of the first conical and second cylindrical interfaces, and the third CTE, are selected to provide the compensation despace when the first and second conical interfaces slide relative to each other and/or the at least one spacer expands or contracts in response to a change in temperature of the device.

22. The device of claim 12, wherein:
the device forms at least part of a camera module.

23. The device of claim 22, wherein:
the camera module is integrated with a digital camera, a smartphone, a personal digital assistant, a computer, a tablet or notebook computer, a kiosk, or a portable electronic device.

24. A method comprising:
providing a lens with a first coefficient of thermal expansion (CTE) and comprising a first interface;
providing an optical device with a second CTE and a second interface;
providing at least one spacer comprising a third interface and a fourth interface; and assembling an optics assembly comprising the lens, the optical device, and the at least one spacer arranged between the lens and the optical device, wherein the third interface of the at least one spacer mates with and slides on is adapted to mate with and slide relative to the first interface of the lens and the fourth interface of the at least one spacer mates with and slides on is adapted to mate with and slide relative to the second interface of the optical device, such that the at least one spacer is configured to slide relative to the lens and the optical device to provide, at least in part, a compensation despace to reduce one or more optical defects caused by changes in a temperature of the optics assembly.

25. The method of claim 24, wherein:
the assembling comprises allowing the lens, the optical device, and the at least one spacer to self-align to a common optical axis.

26. The method of claim 25, further comprising:
assembling a camera module comprising the optics assembly.

27. The method of claim 26, further comprising:
assembling a digital camera, a smartphone, a personal digital assistant, a computer, a tablet or notebook computer, a kiosk, or a portable electronic device comprising the camera module.

* * * * *

UNITED STATES PATENT AND TRADEMARK OFFICE
CERTIFICATE OF CORRECTION

PATENT NO. : 9,465,187 B2
APPLICATION NO. : 13/838210
DATED : October 11, 2016
INVENTOR(S) : Robert J. Calvet It is certified that error appears in the above-identified patent and that said Letters Patent is hereby corrected as shown below:

In the Claims

In Column 14, Line 26, change "mates with and slides on adapted to mate with and slide" to --mates with and slides on--.

In Column 14, Line 27, change "relative to the first interface of the lens and a fourth" to --the first interface of the lens and a fourth--.

In Column 14, Line 28, change "interface that mates with and slides on adapted to mate" to --interface that mates with and slides on--.

In Column 14, Line 29, change "with and slide relative to the second interface of the" to --the second interface of the--.

In Column 14, Line 49, change "and slides on is adapted to mate with and slide realtive" to --and slides on--.

In Column 14, Line 50, change "to the first conical interface; and" to --the first conical interface; and--.

In Column 15, Line 6, change "interfaces that mate with and slide on adapted to mate" to --interfaces that mate with and slide on--.

In Column 15, Line 7, change "with and slide relative to each other, the first interface," to --each other, the first interface,--.

In Column 16, Line 1, change "third interface that mates with and slides on adapted to" to --third interface that mates with and slides on--.

Signed and Sealed this
Twentieth Day of November, 2018

Andrei Iancu
*Director of the United States Patent and Trademark Office*

CERTIFICATE OF CORRECTION (continued)

In Column 16, Line 2, change "mate with and slide relative to the first interface of the" to --the first interface of the--.

In Column 16, Line 4, change "and slides on adapted to mate with and slide relative to" to --and slides on--.

In Column 16, Line 55, change "interfaces that mate with and slide on adapted to mate" to --interfaces that mate with and slide on--.

In Column 16, Line 56, change "with and slide relative to each other, the first interface," to --each other, the first interface,--.

In Column 17, Line 11, change "that mate with adapted to mate with the first and the" to --that mate with the first and the--.

In Column 18, Line 11, change "one spacer mates with and slides on is adapted to mate" to --one spacer mates with and slides on--.

In Column 18, Line 12, change "with and slide relative to the first interface of the lens" to --the first interface of the lens--.

In Column 18, Line 14, change "with and slides on is adapted to mate with and slide" to --with and slides on--.

In Column 18, Line 15, change "relative to the second interface of the optical device," to --the second interface of the optical device,--.